United States Patent
Lübke et al.

[11] Patent Number: 6,040,766
[45] Date of Patent: Mar. 21, 2000

[54] MOTOR VEHICLE NAVIGATION SYSTEM ARRANGEMENT

[75] Inventors: Andreas Lübke, Wolfsburg; Bernd Rech, Saarlouis; Torsten Zawade, Peine, all of Germany

[73] Assignee: Volkswagen AG, Wolfsburg, Germany

[21] Appl. No.: 09/234,262

[22] Filed: Jan. 20, 1999

[30] Foreign Application Priority Data

Jan. 23, 1998 [DE] Germany .......................... 198 02 595

[51] Int. Cl.[7] .................................................. B60Q 1/00
[52] U.S. Cl. .................... 340/438; 340/905; 340/936; 340/988; 340/995
[58] Field of Search .................... 340/438, 905, 340/988, 995, 936; 701/23, 24, 213, 35, 36, 49

[56] References Cited

U.S. PATENT DOCUMENTS

| | | | |
|---|---|---|---|
| 5,247,440 | 9/1993 | Capurka et al. | 701/49 |
| 5,359,528 | 10/1994 | Haendel et al. | 701/35 |
| 5,487,002 | 1/1996 | Diller et al. | 701/1 |
| 5,510,989 | 4/1996 | Zabler et al. | 701/1 |
| 5,546,092 | 8/1996 | Kurokawa et al. | 342/357 |
| 5,565,909 | 10/1996 | Thibadeau et al. | 348/9 |
| 5,612,875 | 3/1997 | Haendel et al. | 701/35 |
| 5,670,845 | 9/1997 | Grant et al. | 315/77 |
| 5,689,269 | 11/1997 | Norris | 342/357 |
| 5,764,139 | 6/1998 | Nojima et al. | 340/461 |
| 5,767,795 | 6/1998 | Schaphorst | 340/988 |

FOREIGN PATENT DOCUMENTS

| | | |
|---|---|---|
| 747671 | of 0000 | European Pat. Off. . |
| 19506890 | of 0000 | Germany . |
| 19507360 | of 0000 | Germany . |
| 19538694 | of 0000 | Germany . |
| 19600734 | of 0000 | Germany . |
| 19601572 | of 0000 | Germany . |
| 19640735 | of 0000 | Germany . |
| 19716354 | of 0000 | Germany . |
| 19750171 | of 0000 | Germany . |
| 3233833 | of 0000 | Germany . |
| 4224536 | of 0000 | Germany . |
| 4327780 | of 0000 | Germany . |
| 4344433 | of 0000 | Germany . |
| 4402614 | of 0000 | Germany . |
| 4433750 | of 0000 | Germany . |
| 4434789 | of 0000 | Germany . |
| 1059118 | 3/1989 | Japan . |
| 4133818 | 5/1992 | Japan . |

OTHER PUBLICATIONS

Article by Laurent Perier, entitled "Kommunikation in Automobile.".

Article by Robert Leindl, entitled "Nicht nur fürs Auto.".

*Primary Examiner*—Daniel J. Wu
*Attorney, Agent, or Firm*—Baker Botts L.L.P.

[57] ABSTRACT

A motor vehicle navigation system arrangement includes a receiver for receiving information from a navigation system and an evaluation unit connected with the receiver for evaluating received navigation data and determining the current position of the vehicle. In addition, a country-determining arrangement is connected to the evaluation unit to determine from the position data the country in which the vehicle is currently located and a control unit sets vehicle parameters in accordance with the requirements of that country.

11 Claims, 1 Drawing Sheet

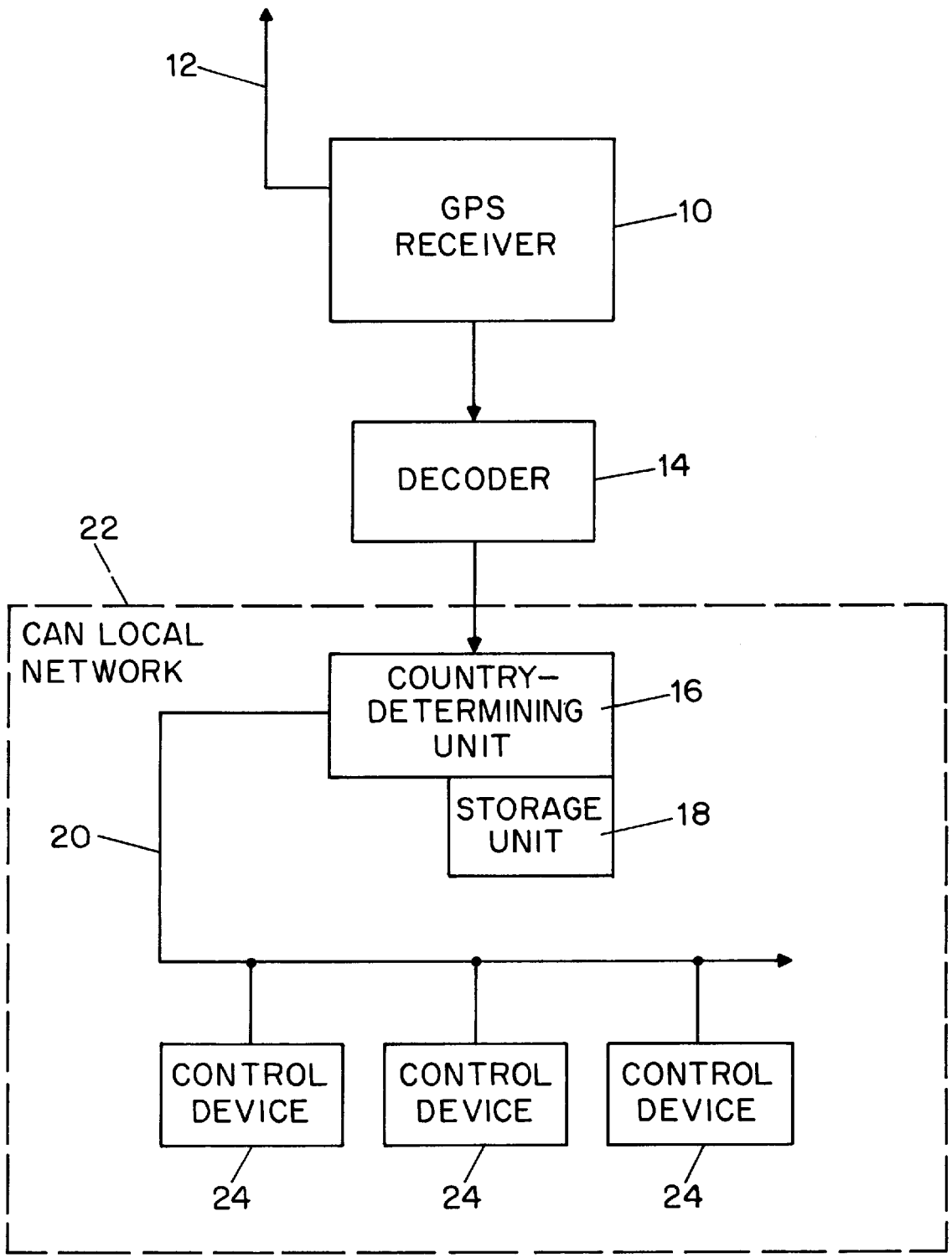

MOTOR VEHICLE NAVIGATION SYSTEM ARRANGEMENT

BACKGROUND OF THE INVENTION

This invention relates to motor vehicle navigation system arrangements which include a receiver for navigation data and an evaluation unit connected to the receiver for evaluation of received navigation data to generate position data relating to the current position of the vehicle.

European Published Application No. 76 97 04 describes an arrangement including a receiver for evaluating location data, in particular GPS [Global Positioning System] location data, wherein additional information to provide location data is receivable by an additional receiver and is selected, evaluated and made available for further processing by an evaluation unit.

German Offenlegungsschrift No. 43 44 433 and U.S. Pat. No. 5,717,389 disclose satellite GPS navigation systems in a motor vehicle for determining current location coordinates for the purpose of computing road use fees.

German Offenlengungsschrift No. 44 34 789 describes a GPS-based safety system for highways. To ensure safety on highways which are used in common by a multiplicity of vehicles, a system is described in which the particular position of each vehicle involved is autonomously established by a navigation process based on satellite navigation (for example, GPS) and reported through an additional communication channel to vehicles using the same highway. An on-board computer determines any possible dangerous conditions and initiates countermeasures. Such a safety system is especially suitable for single-track railroad lines and for avoiding rear-end collisions on superhighways.

German Offenlengungsschrift No. 196 00 734 describes a process for controlling groups of vehicles wherein GPS data for determining the surroundings of a vehicle are combined with statistical data generated in the vehicle and processed into a correcting variable which varies a control program for a stepped or stepless automatic transmission of the motor vehicle.

SUMMARY OF THE INVENTION

Accordingly, it is an object of the present invention to provide a motor vehicle navigation system arrangement which overcomes disadvantages of the prior art.

Another object of the invention is to provide a motor vehicle navigation system arrangement which contributes to increased comfort and convenience in operation of a motor vehicle.

These and other objects of the invention are attained by providing a motor vehicle navigation system which includes an arrangement for determining the country in which the vehicle is located.

With this arrangement a setting of country specifications for a motor vehicle takes place as a function of the current location of the motor vehicle so that a fixed predetermined and invariable sets of country-specific motor vehicle parameters are not necessary. This simplifies the vehicle manufacturing process and the number of variants in the manufacture of motor vehicles for different countries is reduced.

The navigation system arrangement of the invention advantageously utilizes a satellite navigation system, in particular a GPS system.

In a preferred embodiment of the invention, at least one control unit connected with the country-determining arrangement is provided which sets predetermined motor vehicle parameters as a function of the specific country determined by the country-determining arrangement. In this case, the predetermined motor vehicle parameters advantageously include a lock system setting, a unit of measure for a vehicle speed indicator, a unit of measure for a vehicle distance indicator and/or a switch condition for the motor vehicle lighting systems.

For simple and reliable adjustment of the motor vehicle parameters to differing country-specific settings, the vehicle preferably has a bus connection, in particular for a CAN [Controller Area Network] bus, on at least one control device in the vehicle, for the transmission of information concerning the country determined by the country-determining arrangement. The country-determining arrangement preferably is a CAN unit, and the control device advantageously is a CAN unit, in particular an on-board network control device. The control device also drives at least one additional bus connection for setting predetermined country-specific motor vehicle parameters advantageously as a function of the country determined by the country-determining arrangement. In this connection, the additional bus connection preferably is a light module, a lock system control device, a dashboard control device and/or a control device for a motor vehicle lighting system.

In an especially preferred embodiment, a storage unit is provided for storing predetermined sets of country-specific motor vehicle parameter settings for predetermined countries which are called up according to the current country location as determined by the country-determining arrangement so that the appropriate country-specific motor vehicle parameter setting corresponding to the country current determined by the country-determining arrangement is used. The storage unit may advantageously be arranged either separately in the motor vehicle or integral with the country-determining arrangement or integral with a control device.

BRIEF DESCRIPTION OF THE DRAWING

Further objects and advantages of the invention will be apparent from a reading of the following description in conjunction with the accompanying drawing which is a schematic block diagram illustrating representative embodiment of a satellite navigation system arrangement integrated into a motor vehicle according to the invention.

DESCRIPTION OF PREFERRED EMBODIMENT

In the typical embodiment of the invention shown in the drawing, a conventional GPS receiver 10 receives navigation data from satellites through an antenna 12. The navigation data are evaluated in a decoder 14 which computes corresponding current position data for the vehicle. The decoder 14 sends this data on to a conventional arrangement, not represented in detail, for satellite-based navigation such as, for example, a navigation computer, which guides a driver of the motor vehicle to a desired destination by way of a corresponding display. According to the invention, the decoder 14 also transmits the position data computed by it to a country-determining unit 16. From the position data, the country-determining unit 16 determines the country in which the vehicle is currently located, based on the instantaneous position data.

A set of country-specific parameters for each country is stored in a storage unit 18, and these parameters are called up according to the current country as determined by the country-determining arrangement 16. The country-determining arrangement 16 then actuates, through a data bus 20 in a CAN local network 22, corresponding control devices 24 in the vehicle so that country-specific parameters are set according to the current location of the vehicle. The control devices 24 may include particular separate control devices, for example a control device for a motor vehicle lighting system, a lock system control device and/or a dashboard control device. Alternatively, however, a single control device 24, which controls all relevant vehicle components, may be provided.

Country-specific settings are thus set on the motor vehicle as a function of the current country location of the vehicle. For example, dimmed headlights or parking lights are automatically turned on in Scandinavian countries, since this is required there even in the daytime. Thus, with the present invention, the driver need not bother about such settings. In addition, the dashboard control device, for example, resets particularly a digital speed indicator to MPH (miles per hour) or km/h and/or particularly a digital distance indicator to miles or km, according to whether the vehicle is being operated in Europe or in the USA. Thus, corresponding country-specific programming need not be provided. Upon entry into the United Kingdom, in which driving on the left is the rule, a light module, for example, changes headlight settings so that an asymmetrical light is correspondingly directed toward the left rather than toward the right. The driver therefore need no longer undertake the laborious task of disassembly of headlight parts to accomplish this.

At the same time, use of the CAN 22 makes the arrangement especially flexible and reduces the wiring required for the electrical system, since all of the information is transmitted over a single data line. The control devices 24 and the country-determining arrangement 16 are advantageously designed as CAN units to which corresponding addresses are assigned. These addresses are appended to the information or data packets traveling over the CAN bus 20, so that each CAN unit receives all data packets, but can immediately establish, by address comparison, whether a particular data packet is intended for it or for another CAN unit.

Although the invention has been described herein with reference to specific embodiments, many modifications and variations therein will readily occur to those skilled in the art. Accordingly, all such variations and modifications are included within the intended scope of the invention.

We claim:

1. A motor vehicle navigation system arrangement comprising:
   a receiver for receiving navigation data from a navigation system
   an evaluation unit connected to the receiver for evaluating navigation data and providing position data relating to the current position of the vehicle;
   a country-determining arrangement connected to the evaluation unit for determining the country in which the vehicle is currently located, and
   a control arrangement responsive to the country-determining arrangement for setting at least one of a measuring unit for a speed indicator and a measuring unit for an indicator of distance traveled.

2. A motor vehicle navigation system arrangement according to claim 1 wherein the control arrangement responsive to the country-determining arrangement is arranged to set additional motor vehicle parameters as a function of a country determined by the country-determining arrangement.

3. A motor vehicle navigation system arrangement according to claim 2 wherein the additional motor vehicle parameters include at least one of a lock system setting and a switch condition for a motor vehicle lighting system.

4. A motor vehicle navigation system arrangement according to claim 1 including a data bus on at least one control device in the motor vehicle for the transmission of information concerning a country determined by the country-determining arrangement.

5. A motor vehicle navigation system arrangement according to claim 4 wherein the country-determining arrangement includes a CAN unit.

6. A motor vehicle navigation system arrangement according to claim 4 wherein the control device is a CAN unit.

7. A motor vehicle navigation system arrangement according to claim 4 wherein the control device drives at least one CAN unit for setting predetermined country-specific motor vehicle parameters as a function of a country determined by the country-determining arrangement.

8. A motor vehicle navigation system arrangement according to claim 7 wherein the control device is an additional CAN unit.

9. A motor vehicle navigation system arrangement according to claim 4 wherein the CAN unit is at least one of a light module, a lock system control device, a dashboard control device and a control device for a motor vehicle lighting system.

10. A motor vehicle navigation system arrangement according to claim 1 including a storage unit for storing predetermined sets of country-specific motor vehicle parameter settings for predetermined countries which are called up according to the country determined by the country-determining arrangement so that an appropriate country-specific motor vehicle parameter setting, corresponding to the country currently determined by the country-determining arrangement, is set.

11. A motor vehicle navigation system arrangement according to claim 10 wherein the storage unit is selected from a storage unit which is arranged separately in the motor vehicle, a storage unit which is integral with the country-determining arrangement and a storage unit which is integral with a control device.

* * * * *